United States Patent
Yahata

(10) Patent No.: US 11,711,636 B2
(45) Date of Patent: Jul. 25, 2023

(54) IMAGE PROCESSING DEVICE

(71) Applicant: SK hynix Inc., Icheon-si (KR)

(72) Inventor: Kazuhiro Yahata, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 32 days.

(21) Appl. No.: 17/542,160

(22) Filed: Dec. 3, 2021

(65) Prior Publication Data

US 2022/0377274 A1 Nov. 24, 2022

(30) Foreign Application Priority Data

May 18, 2021 (KR) .......................... 10-2021-0063985

(51) Int. Cl.
*H04N 25/772* (2023.01)
*G06T 7/11* (2017.01)
*H04N 25/57* (2023.01)

(52) U.S. Cl.
CPC ............. *H04N 25/772* (2023.01); *G06T 7/11* (2017.01); *H04N 25/57* (2023.01); *G06T 2207/20208* (2013.01); *G06T 2207/30201* (2013.01)

(58) Field of Classification Search
CPC .... H04N 25/772; H04N 25/57; H04N 25/585; G06T 7/11; G06T 2207/20208; G06T 2207/30201; G06T 7/30; G06T 5/001; G06V 40/16
See application file for complete search history.

(56) References Cited

U.S. PATENT DOCUMENTS

2017/0366765 A1* 12/2017 Seifi ...................... H04N 23/741
2019/0174075 A1* 6/2019 Numata ............ H01L 27/14645

FOREIGN PATENT DOCUMENTS

JP 2012175600 A 9/2012
KR 101633893 B1 6/2016

* cited by examiner

*Primary Examiner* — Shahbaz Nazrul
(74) *Attorney, Agent, or Firm* — Perkins Coie LLP

(57) ABSTRACT

An image processing device is disclosed. The image processing device includes at least one first pixel having a first sensitivity, a second pixel having a second sensitivity different from the first sensitivity, a processor, and a synthesizer. The processor calculates a sampling position of the at least one first pixel and a sampling position of the second pixel, determines a reference position and adjusts the sampling position of the at least one first pixel or the second pixel based on the reference position.

20 Claims, 19 Drawing Sheets

IMAGE PROCESSING DEVICE

CROSS-REFERENCE TO RELATED APPLICATION

This patent document claims the priority and benefits of Korean patent application No. 10-2021-0063985, filed on May 18, 2021, which is incorporated by reference in its entirety as part of the disclosure of this patent document.

TECHNICAL FIELD

The technology and implementations disclosed in this patent document generally relate to an image processing device, and more particularly to technology for synthesizing a plurality of images sensed by an image sensing device.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various fields such as smart phones, digital cameras, game machines, IOT (Internet of Things), robots, security cameras and medical micro cameras.

The image sensing device may be roughly divided into CCD (Charge Coupled Device) image sensing devices and CMOS (Complementary Metal Oxide Semiconductor) image sensing devices. The CCD image sensing devices offer a better image quality, but they tend to consume more power and are larger as compared to the CMOS image sensing devices. The CMOS image sensing devices are smaller in size and consume less power than the CCD image sensing devices. Furthermore, CMOS sensors are fabricated using the CMOS fabrication technology, and thus photosensitive elements and other signal processing circuitry can be integrated into a single chip, enabling the production of miniaturized image sensing devices at a lower cost. For these reasons, CMOS image sensing devices are being developed for many applications including mobile devices.

SUMMARY

Various embodiments of the disclosed technology relate to an image processing device capable of reducing occurrences of the bokeh phenomenon when synthesizing a plurality of images generated by a pixel array in which pixels having different sensitivities are mixed.

In one aspect, an image processing device is provided to comprise: at least one first pixel having a first sensitivity; a second pixel having a second sensitivity different from the first sensitivity; a processor configured to calculate a sampling position of the at least one first pixel and a sampling position of the second pixel, determine a reference position based on the calculated sampling positions, and adjust the sampling position of the at least one first pixel based on a position of the second pixel that is determined to be the reference position from among the first and second pixels; and a synthesizer configured to synthesize an image using pixel values of the pixels processed by the processor, and determine an output pixel value of each pixel.

In another aspect, an image processing device is provided to include at least one first pixel having a first sensitivity in response to an increase of light incident on the at least one first pixel, a second pixel having a second sensitivity different from the first sensitivity in response to the increase of light incident on the second pixel, a processor configured to calculate a sampling position of the at least one first pixel and a sampling position of the second pixel, determine a reference position, and adjust the sampling position of the at least one first pixel or the second pixel based on the reference position, and a synthesizer configured to synthesize an image using pixel values of the pixels processed by the processor, and provide an output pixel value of each pixel.

In another aspect, an image processing device is provided to include a first pixel having a first sensitivity, at least one second pixel having a second sensitivity different from the first sensitivity, a third pixel having a third sensitivity different from each of the first sensitivity and the second sensitivity, a processor configured to calculate a sampling position of the first pixel, a sampling position of the at least one second pixel, and a sampling position of the third pixel, determine a reference position based on the calculated sampling positions, and, when the at least one second pixel from among the first pixel, the at least one second pixel, and the third pixel is determined to be the reference position, and adjust the sampling position of the first pixel and the sampling position of the third pixel based on the at least one second pixel determined to be the reference position, and a synthesizer configured to synthesize an image using pixel values of the pixels processed by the processor, and determine an output pixel value of each pixel.

In another aspect, an image processing device is provided to comprise: at least one first pixel having a first sensitivity; a second pixel having a second sensitivity different from the first sensitivity; a processor configured to: calculate a sampling position of the at least one first pixel and a sampling position of the second pixel, and when one image includes a low-illuminance region where a brightness is less than a reference brightness and a high-illuminance region where a brightness is equal to or higher than the reference brightness, allocate different weights to the at least one first pixel and the second pixel, and determine the reference position based on the allocated weights; and a synthesizer configured to synthesize an image using pixel values of the pixels processed by the processor, and determine an output pixel value of each pixel.

In another aspect, an image processing device may include at least one first pixel having a first sensitivity, a second pixel having a second sensitivity different from the first sensitivity, a processor operatively coupled to the at least one first pixel and the second pixel and configured to calculate a sampling position of the at least one first pixel and a sampling position of the second pixel, allocate weights to the at least one first pixel and the second pixel based on brightness levels of portions of an image that is produced by the at least one first pixel and the second pixel, and determine a reference position based on the allocated weights, wherein the sampling position of the at least one first pixel or the sampling position of the second pixel is adjusted based on the reference position.

It is to be understood that both the foregoing general description and the following detailed description of the disclosed technology are illustrative and explanatory and are intended to provide further explanation of the disclosed technology.

DETAILED DESCRIPTION

This patent document provides implementations and examples of image processing device designs that may be used in configurations to substantially address one or more technical or engineering issues and to mitigate limitations or disadvantages encountered in some other image processing device designs. Some implementations of the disclosed technology can be used to construct an image processing device capable of reducing occurrences of the bokeh phenomenon when synthesizing a plurality of images generated by a pixel array in which pixels having different sensitivities are mixed. The disclosed technology provides various implementations of an image processing device which can reduce occurrences of the bokeh phenomenon caused by interpolation when synthesizing a plurality of images in a pixel array in which pixels having different sensitivities are mixed.

Hereafter, various embodiments will be described with reference to the accompanying drawings. However, it should be understood that the disclosed technology is not limited to specific embodiments, but includes various modifications, equivalents and/or alternatives of the embodiments. The embodiments of the disclosed technology may provide a variety of effects capable of being directly or indirectly recognized through the disclosed technology.

Figure 1:
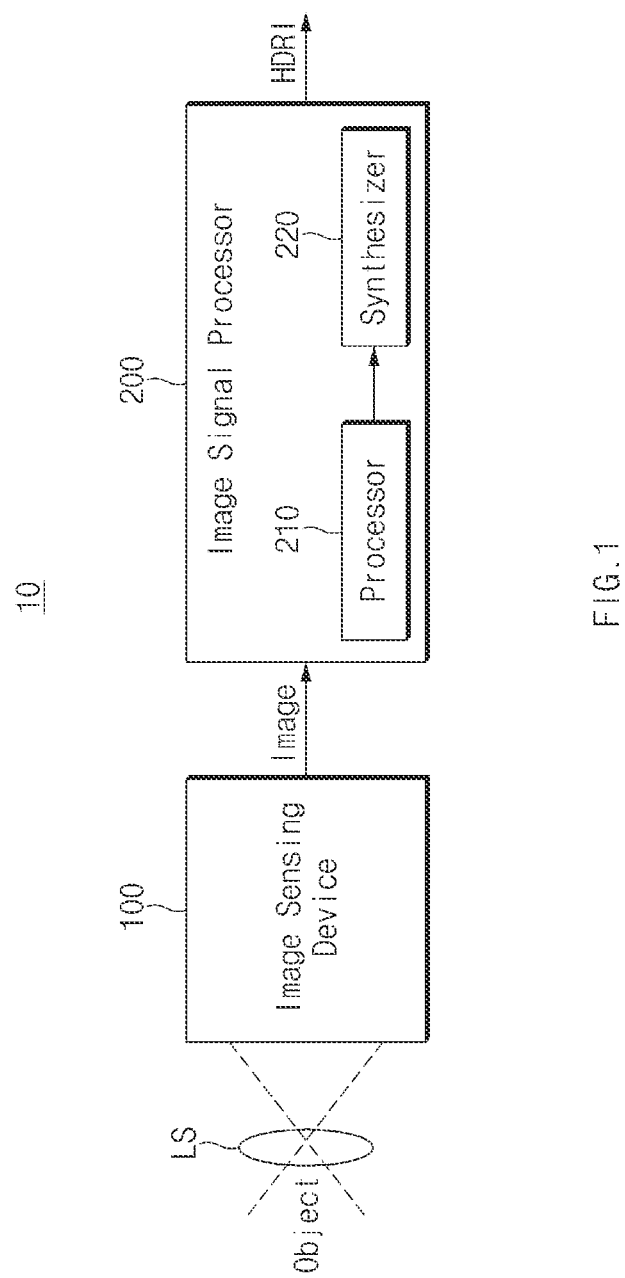
FIG. 1 is a schematic diagram illustrating an example of an image processing device based on some implementations of the disclosed technology.

FIG. 1 is a schematic diagram illustrating an example of an image processing device 10 based on some implementations of the disclosed technology.

Referring to FIG. 1, the image processing device 10 may be embedded in an electronic device or may be implemented as an electronic device. Here, the electronic device may capture (or photograph) an image, may display the captured image, or may perform operations based on the captured image. In this case, the image processing device 10 may include various kinds of electronic devices, for example, a digital camera, a smartphone, a wearable device, an Internet of Things (IoT) device, a personal computer (PC), a tablet PC, a personal digital assistant (PDA), a portable multimedia player (PMP), a navigation device, a drone, etc., or may be mounted to other devices serving as constituent elements of various electronic devices such as a vehicle, a medical device, furniture, manufacturing equipment, a security device, doors, a variety of measurement instruments, etc.

The image processing device 10 may include an image sensing device 100 and an image signal processor (ISP) 200.

The image sensing device 100 may receive an optical signal of a target object through an optical lens (LS), may convert the received optical signal into electrical signals, and may form (or produce) an image of the target object based on the electrical signals. The image sensing device 100 may transmit the formed image of the target object to the image signal processor (ISP) 200.

The image sensing device 100 may produce a plurality of images having different levels or degrees of brightness with respect to the same target object. For example, the image sensing device 100 may produce multiple exposure images by photographing the same target object based on different exposure times.

In another example, the image sensing device 100 may produce a single image of the object, may produce multiple images (e.g., consecutive images) of the object, or may produce video data of the object. In another example, the image sensing device 100 may produce high-resolution image data having a large number of pixels, or may produce low-resolution image data having a small number of pixels. In still another example, the image sensing device 100 may produce high-speed photographed image data having a large number of frames per second, or may produce low-speed photographed image data having a small number of frames per second.

The image signal processor 200 may perform image processing on the received images. Here, the term "image processing" may include a variety of processes, for example, a process for synthesizing an image, a process for producing a high dynamic range (HDR) image, a process for image quality improvement (e.g., noise removal, brightness adjustment, sharpness adjustment, etc.), a process for image processing (e.g., change of image size, change of data format, etc.), and so on. The image signal processor 200 performs HDR processing, resulting in formation of a high dynamic range image (HDRI) having an increased dynamic range and an improved SNR (signal to noise ratio)

The image signal processor 200 may be implemented in hardware, software (or firmware) or a combination of hardware and software. In some implementations, the image signal processor 200 may also be implemented as any one of various kinds of processors capable of performing image processing, for example, a graphics processing unit (GPU), a digital processing processor (DSP), etc. The image signal processor 200 may be implemented as a single chip, or may be embedded in an application processor (AP).

In some implementations, the image signal processor 200 may include a processor 210 and a synthesizer 220.

Here, the processor 210 may receive a plurality of images having different exposure amounts and different dynamic ranges through the image sensing device 100. For example, the processor 210 may receive a pixel value of a high-sensitivity pixel (HPX) and a pixel value of a low-sensitivity pixel (LPX). In another embodiment, the processor 210 may receive a pixel value of the high-sensitivity pixel (HPX), a pixel value of the middle-sensitivity pixel (MPX), and a pixel value of the low-sensitivity pixel (LPX). Additional details on HPX, LPX and MPX pixels are provided in later section of this patent document. The processor 210 may calculate a sampling position based on pixel values received through the image sensing device 100, and may determine a reference position based on the calculated sampling position.

The synthesizer 220 may calculate a shifting amount of each of the high-sensitivity pixel (HPX), the middle-sensitivity pixel (MPX), and the low-sensitivity pixel (LPX) at the determined reference position. In other words, the synthesizer 220 may calculate how far each of the high-sensitivity pixel (HPX), the middle-sensitivity pixel (MPX), and the low-sensitivity pixel (LPX) is spaced (or shifted) from the determined reference position. Thereafter, the synthesizer 220 may perform interpolation processing based on the calculated shifting amounts of the above sensitivity pixels HPX, MPX, and LPX. The synthesizer 220 may synthesize the pixel values processed by the processor 210, and may determine an output pixel value of each pixel. The synthesizer 220 may output a high dynamic range image (HDRI) by synthesizing the pixel values processed by the processor 210.

Figure 2:
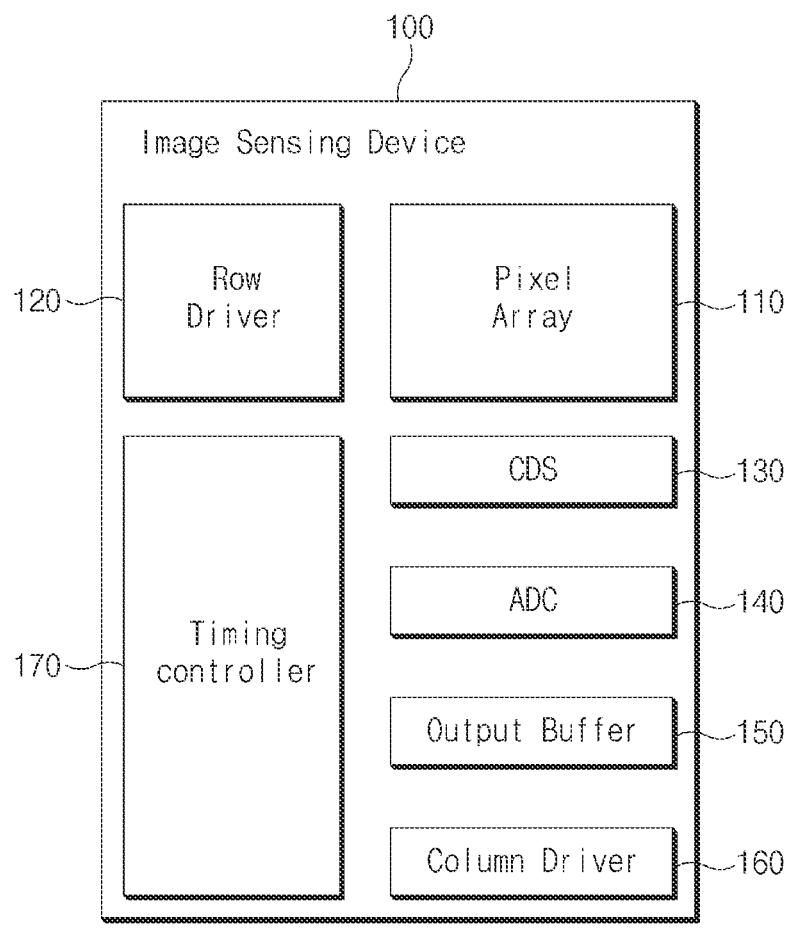
FIG. 2 is a block diagram illustrating an example of an image sensing device shown in FIG. 1 based on some implementations of the disclosed technology.

FIG. 2 is a block diagram illustrating an image sensing device 100 shown in FIG. 1 based on some implementations of the disclosed technology.

Referring to FIG. 2, the image sensing device 100 may include a pixel array 110, a row driver 120, a correlated double sampler (CDS) 130, an analog-digital converter (ADC) 140, an output buffer 150, a column driver 160 and a timing controller 170. The components of the image sensing device 100 illustrated in FIG. 1 are discussed by way of example only, and this patent document encompasses numerous other changes, substitutions, variations, alterations, and modifications.

The pixel array 110 may include a plurality of unit imaging pixels arranged in rows and columns. In one example, the plurality of unit imaging pixels can be arranged in a two dimensional pixel array including rows and columns. In another example, the plurality of unit imaging pixels can be arranged in a three dimensional pixel array. The plurality of unit pixels may convert an optical signal into an electrical signal on a unit pixel basis or a pixel group basis, where unit pixels in a pixel group share at least certain internal circuitry. The pixel array 110 may receive driving signals, including a row selection signal, a pixel reset signal and a transmission signal, from the row driver 120. Upon receiving the driving signal, corresponding imaging pixels in the pixel array 110 may be activated to perform the operations corresponding to the row selection signal, the pixel reset signal, and the transmission signal.

The row driver 120 may activate the pixel array 110 to perform certain operations on the imaging pixels in the corresponding row based on commands and control signals provided by controller circuitry such as the timing controller 170. In some implementations, the row driver 120 may select one or more imaging pixels arranged in one or more rows of the pixel array 110. The row driver 120 may generate a row selection signal to select one or more rows among the plurality of rows. The row driver 120 may sequentially enable the pixel reset signal for resetting imaging pixels corresponding to at least one selected row, and the transmission signal for the pixels corresponding to the at least one selected row. Thus, a reference signal and an image signal, which are analog signals generated by each of the imaging pixels of the selected row, may be sequentially transferred to the CDS 130. The reference signal may be an electrical signal that is provided to the CDS 130 when a sensing node of an imaging pixel (e.g., floating diffusion node) is reset, and the image signal may be an electrical signal that is provided to the CDS 130 when photocharges generated by the imaging pixel are accumulated in the sensing node.

CMOS image sensors may use the correlated double sampling (CDS) to remove undesired offset values of pixels known as the fixed pattern noise by sampling a pixel signal twice to remove the difference between these two samples. In one example, the correlated double sampling (CDS) may remove the undesired offset value of pixels by comparing pixel output voltages obtained before and after photocharges generated by incident light are accumulated in the sensing node so that only pixel output voltages based on the incident light can be measured. In some embodiments of the disclosed technology, the CDS 130 may sequentially sample and hold voltage levels of the reference signal and the image signal, which are provided to each of a plurality of column lines from the pixel array 110. Thus, the CDS 130 may sample and hold the voltage levels of the reference signal and the image signal which correspond to each of the columns of the pixel array 110.

In some implementations, the CDS 130 may transfer the reference signal and the image signal of each of the columns as a correlate double sampling signal to the ADC 140 based on control signals from the timing controller 170.

The ADC 140 is used to convert analog CDS signals into digital signals. In some implementations, the ADC 140 may be implemented as a ramp-compare type ADC. The ramp-compare type ADC may include a comparator circuit for comparing the analog pixel signal with a reference signal such as a ramp signal that ramps up or down, and a timer counts until a voltage of the ramp signal matches the analog pixel signal. In some embodiments of the disclosed technology, the ADC 140 may convert the correlate double sampling signal generated by the CDS 130 for each of the columns into a digital signal, and output the digital signal. The ADC 140 may perform a counting operation and a computing operation based on the correlate double sampling signal for each of the columns and a ramp signal provided from the timing controller 170. In this way, the ADC 140 may eliminate or reduce noises such as reset noise arising from the imaging pixels when generating digital image data.

The ADC 140 may include a plurality of column counters. Each column of the pixel array 110 is coupled to a column counter, and image data can be generated by converting the correlate double sampling signals received from each column into digital signals using the column counter. In another embodiment of the disclosed technology, the ADC 140 may include a global counter to convert the correlate double sampling signals corresponding to the columns into digital signals using a global code provided from the global counter.

The output buffer 150 may temporarily hold the column-based image data provided from the ADC 140 to output the image data. In one example, the image data provided to the output buffer 150 from the ADC 140 may be temporarily stored in the output buffer 150 based on control signals of the timing controller 170. The output buffer 150 may provide an interface to compensate for data rate differences or transmission rate differences between the image sensing device 100 and other devices.

The column driver 160 may select a column of the output buffer upon receiving a control signal from the timing controller 170, and sequentially output the image data, which are temporarily stored in the selected column of the output buffer 150. In some implementations, upon receiving an address signal from the timing controller 170, the column driver 160 may generate a column selection signal based on the address signal and select a column of the output buffer 150, outputting the image data as an output signal from the selected column of the output buffer 150.

The timing controller 170 may control operations of the row driver 120, the ADC 140, the output buffer 150 and the column driver 160.

The timing controller 170 may provide the row driver 120, the column driver 160 and the output buffer 150 with a clock signal required for the operations of the respective components of the image sensing device 100, a control signal for timing control, and address signals for selecting a row or column. In an embodiment of the disclosed technology, the timing controller 170 may include a logic control circuit, a phase lock loop (PLL) circuit, a timing control circuit, a communication interface circuit and others.

Figure 3:
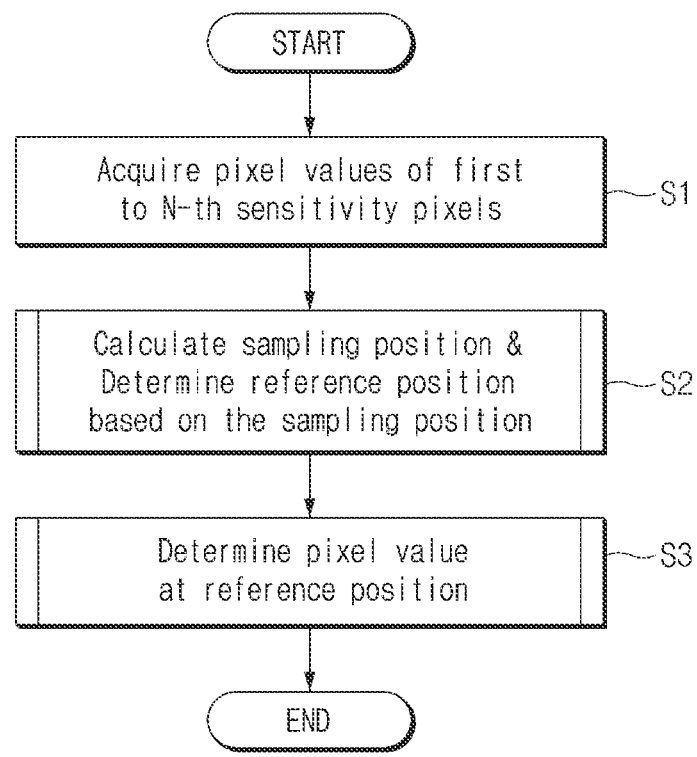
FIG. 3 is a flowchart illustrating an example of operations of an image signal processor shown in FIG. 1 based on some implementations of the disclosed technology.

FIG. 3 is a flowchart illustrating an example of operations of the image signal processor 200 shown in FIG. 1 based on some implementations of the disclosed technology.

Referring to FIG. 3, the processor 210 of the image signal processor 200 may acquire pixel values of first to N-th sensitivity pixels (where 'N' is an integer equal to or greater than 2) having different sensitivities from the image sensing device 100 (Step S1). For example, the processor 210 may acquire a pixel value of the high-sensitivity pixel (HPX) and a pixel value of the low-sensitivity pixel (LPX). In another example, the processor 210 may acquire a pixel value of the high-sensitivity pixel (HPX), a pixel value of the middle-sensitivity pixel (MPX), and a pixel value of the low-sensitivity pixel (LPX).

Subsequently, the processor 210 may calculate a sampling position for the first to N-th sensitivity pixels, and may determine a reference position based on the calculated sampling position (Step S2). In step S2, the sampling position may refer to an average position of some pixels having the same sensitivity from among the first to N-th sensitivity pixels.

Thereafter, the synthesizer 220 may determine a pixel value at the determined reference position (Step S3). That is, the synthesizer 220 may synthesize the pixel values that have been processed based on the determined reference position, and may thus output the HDR image (HDRI) based on the synthesized result.

Figure 4:
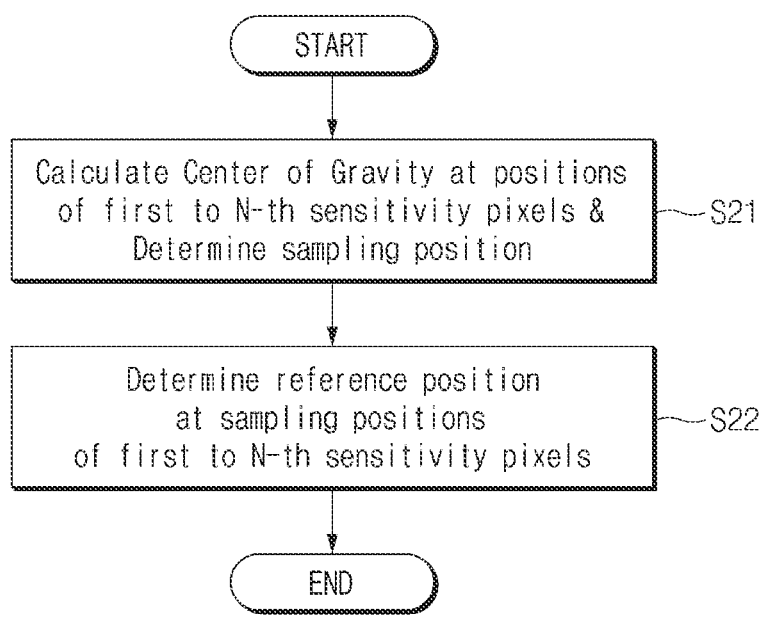
FIG. 4 is a detailed flowchart illustrating an example of an operation of determining a sampling position and a reference position shown in FIG. 3 based on some implementations of the disclosed technology.

FIG. 4 is a detailed flowchart illustrating an example of an operation of determining a sampling position and a reference position shown in FIG. 3 based on some implementations of the disclosed technology.

Referring to FIG. 4, the processor 210 may calculate a center of gravity of the positions of the first to N-th sensitivity pixels, and may determine a sampling position based on the calculated result (Step S21). In some implementations, the processor 210 may calculate the sampling position of each of the first to N-th sensitivity pixels only once, and may store the calculated sampling positions of the first to N-th sensitivity pixels. If necessary, upon receiving a new pixel value, the processor 210 may omit a process of recalculating the sampling position for the new pixel value, and may then process a subsequent stage using the stored sampling positions of the first to N-th sensitivity pixels. The operation of determining the sampling position using the processor 210 will be described later with reference to FIGS. 5 to 11.

For example, the processor 210 may determine a sampling position at the high-sensitivity pixel (HPX), and may determine a sampling position at the low-sensitivity pixel (LPX). In some implementations, the processor 210 may determine a sampling position at the high-sensitivity pixel (HPX), may determine a sampling position at the middle-sensitivity pixel (MPX), and may determine a sampling position at the low-sensitivity pixel (LPX).

Subsequently, the processor 210 may determine a reference position based on the determined sampling positions of the first to N-th sensitivity pixels (Step S22). For example, the processor 210 may determine a reference position based on the sampling positions of the high-sensitivity pixel (HPX) and the low-sensitivity pixel (LPX). In some implementations, the processor 210 may determine a reference position based on the sampling positions of the high-sensitivity pixel (HPX), the middle-sensitivity pixel (MPX), and the low-sensitivity pixel (LPX). The operation of determining the reference position using the processor 210 will be described later with reference to FIGS. 12 to 18.

Figure 5:
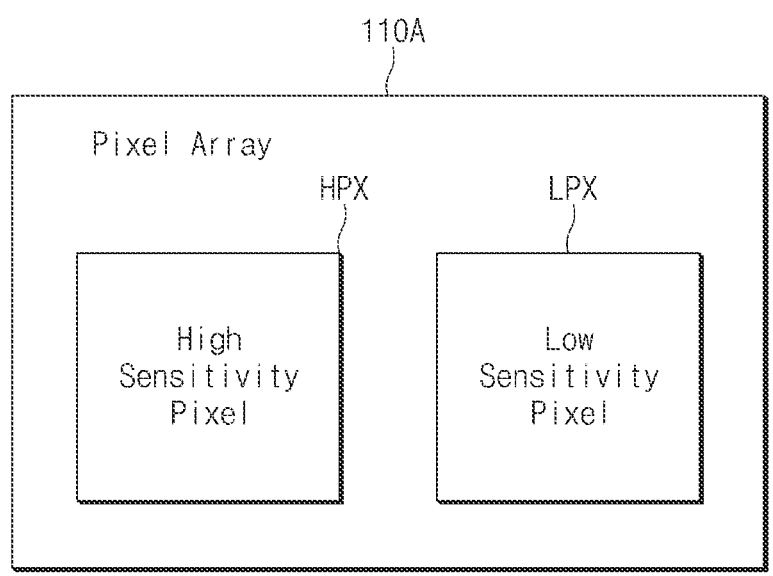
FIG. 5 is a schematic diagram illustrating an example of a pixel array shown in FIG. 2 based on some implementations of the disclosed technology.

FIG. 5 is a schematic diagram illustrating an example of a pixel array 110A shown in FIG. 2 based on some implementations of the disclosed technology.

Referring to FIG. 5, the pixel array 110A is an example of the pixel array 110 shown in FIG. 2. Although FIG. 5 shows that the pixel array 110A includes only two pixels, i.e., a high-sensitivity pixel (HPX) and a low-sensitivity pixel (LPX), other implementations are also possible. For example, the pixel array 110A may include N pixels, whereby N is a positive integer equal to or greater than 2. The pixel array 110A may include two types of pixels, i.e., a high-sensitivity pixel (HPX) with a higher sensing sensitivity or higher light-to-electrical conversion gain and a low-sensitivity pixel (LPX) with a lower sensing sensitivity or lower light-to-electrical conversion gain. Accordingly, each of the pixels included in the pixel array 110A may correspond to either the high-sensitivity pixel (HPX) or the low-sensitivity pixel (LPX). Both of the high-sensitivity pixel (HPX) and the low-sensitivity pixel (LPX) may be arranged in the pixel array 110A together. The number of high-sensitivity pixels (HPX) and the number of low-sensitivity pixels (LPX) included in the pixel array 110A may be selected as desired in specific implementations.

The high-sensitivity pixel (HPX) may be a pixel providing a relatively large increase in response to an increase in the intensity of incident light. The term "response" may refer to a pixel signal generated by the high-sensitivity pixel (HPX) in response to incident light. Thus, the high-sensitivity pixel (HPX) may refer to a pixel having a relatively high sensitivity to incident light.

The low-sensitivity pixel (LPX) may refer to a pixel having a relatively small increase in response to an increase in the intensity of incident light. Thus, the low-sensitivity pixel (LPX) may refer to a pixel having a relatively low sensitivity to incident light.

Figure 6:
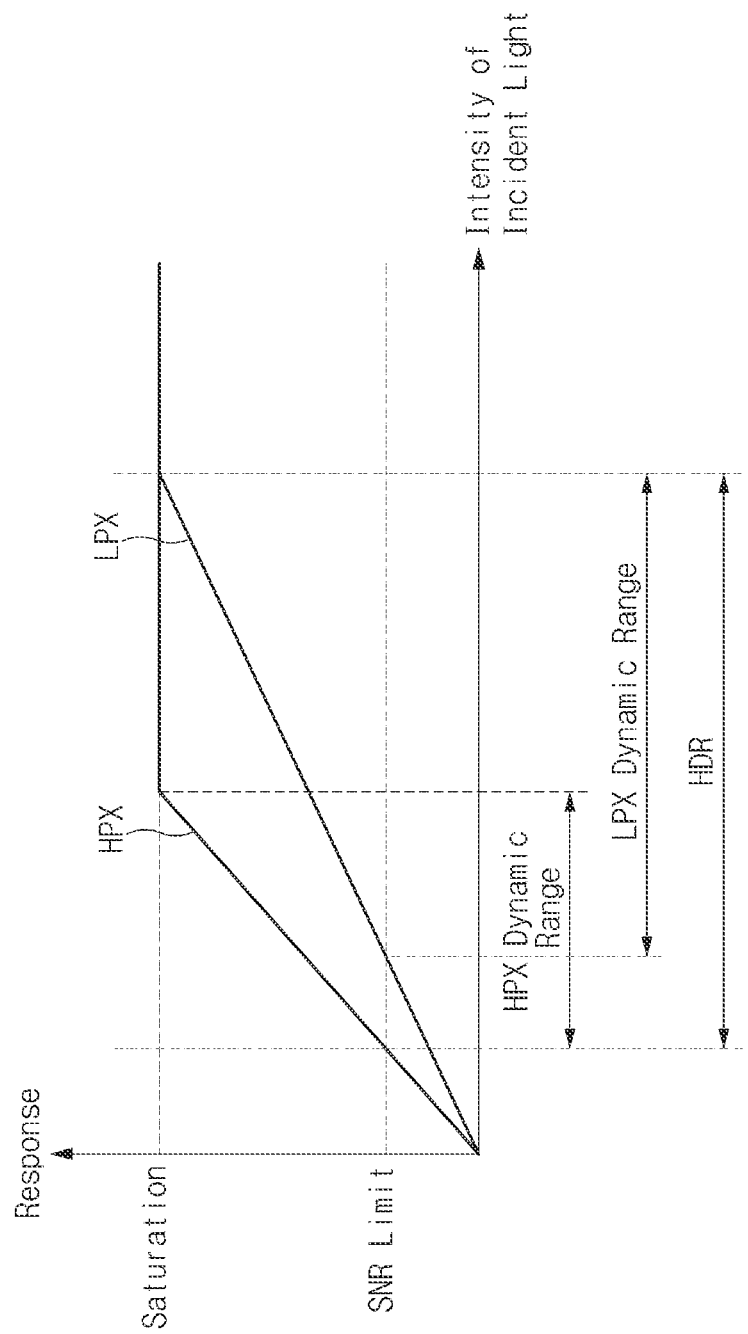
FIG. 6 is a graph illustrating an example of responses of a high-sensitivity pixel and a low-sensitivity pixel shown in FIG. 5 based on some implementations of the disclosed technology.

FIG. 6 is a graph illustrating an example of responses of a high-sensitivity pixel (HPX) and a low-sensitivity pixel (LPX) shown in FIG. 5 based on some implementations of the disclosed technology.

As can be seen from FIG. 6, a response of the high-sensitivity pixel (HPX) and a response of the low-sensitivity pixel (LPX) are changed depending on illuminance indicating the intensity of incident light applied to the corresponding pixel.

In FIG. 6, two different responses are shown, one of which is a signal-to-noise ratio (SNR) threshold level (also called 'SNR limit') and the other of which is a saturation level.

The signal-to-noise ratio (SNR) threshold level refers to a threshold value that can satisfy a reference SNR that is predetermined. The response less than the SNR threshold level may be treated as an invalid response as not satisfying the reference SNR, and the response greater than the SNR threshold level may be treated as a valid response as satisfying the reference SNR. The reference SNR may be determined experimentally in consideration of characteristics of the image sensing device 100.

A saturation level refers to a maximum response level that indicates the intensity of incident light. The saturation level may be determined by the photo-conversion capability of a photoelectric conversion element to produce photocharges in response to the incident light and the electrical signal conversion capability of a floating diffusion (FD) region to output electrical signals corresponding to photocharges. As the intensity of incident light increases, the response may increase in proportional to the intensity of incident light until the response reaches the saturation level. After the response reaches the saturation level, the response may not increase although the intensity of incident light increases. For example, after the response reaches the saturation level, the response may have a same value as the saturation value and not increase above the saturation level.

The valid response of each pixel may refer to a response that can indicate the intensity of incident light while satisfying the reference SNR. The range of the intensity of incident light corresponding to the valid response of a pixel may be referred to as a dynamic range of the pixel. The pixel can provide a valid response during the dynamic range of the pixel.

The high-sensitivity pixel (HPX) provides the response having a relatively large increase in photocharge produced in response to an increase in the intensity of incident light. Thus, the response of the high-sensitivity pixel (HPX) may have a relatively greater slope in response to the increase of the intensity of incident light until the response reaches the saturation level and have a fixed level corresponding to the saturation level regardless of the increase of the intensity of incident light after the response reaches the saturation level.

As illustrated in FIG. 6, a minimum value of a high-sensitivity pixel (HPX) dynamic range may be less than the minimum value of a low-sensitivity pixel (LPX) dynamic range, and a maximum value of the high-sensitivity pixel (HPX) dynamic range may be less than the maximum value of the low-sensitivity pixel (LPX) dynamic range. Therefore, in a low-illuminance range in which the intensity of incident light is relatively small, the high-sensitivity pixel (HPX) may be more suitably used to sense the intensity of incident light. In a high-illuminance range in which the intensity of incident light is relatively large, the low-sensitivity pixel (LPX) may be more suitably used to sense the intensity of incident light.

In the implementations of the disclosed technology, high dynamic range (HDR) can be implemented using both a response of the high-sensitivity pixel (HPX) suitable for the low-illuminance range and a response of the low-sensitivity pixel (LPX) suitable for the high-illuminance range. As compared to the image sensing device including only one type of the pixel that is either the high-sensitivity pixel (HPX) or the low-sensitivity pixel (LPX) is used, the image sensing device including both the high-sensitivity pixel (HPX) and the low-sensitivity pixel (LPX) can allow the pixel array 110A to have a high dynamic range (HDR) that ranges from the minimum value of the HPX dynamic range to the maximum value of the LPX dynamic range. In the implementation of the disclosed technology, at least a portion of the HPX dynamic range and at least a portion of the LPX dynamic range may overlap each other.

A method for synthesizing a high dynamic range (HDR) image corresponding to the high dynamic range (HDR) using the high-sensitivity pixel (HPX) and the low-sensitivity pixel (LPX) may be implemented in various manners. For example, in some implementations, the HDR image may be synthesized by calculating (e.g., summing) the HPX response and the LPX response, and/or forming of an image based on the HPX response at a low-illuminance level and forming of an image based on the LPX response at a high-illuminance level can be implemented. Without being limited thereto, other various imaging techniques can be implemented to provide a high dynamic range (HDR) image corresponding to the high dynamic range (HDR) using the high-sensitivity pixel (HPX) and the low-sensitivity pixel (LPX).

In the image sensing device 100, both of the high-sensitivity pixel (HPX) and the low-sensitivity pixel (LPX) are arranged in the pixel array 110A, such that the image sensing device 100 can synthesize the HDR image using an image acquired through a single exposure time.

Figure 7:
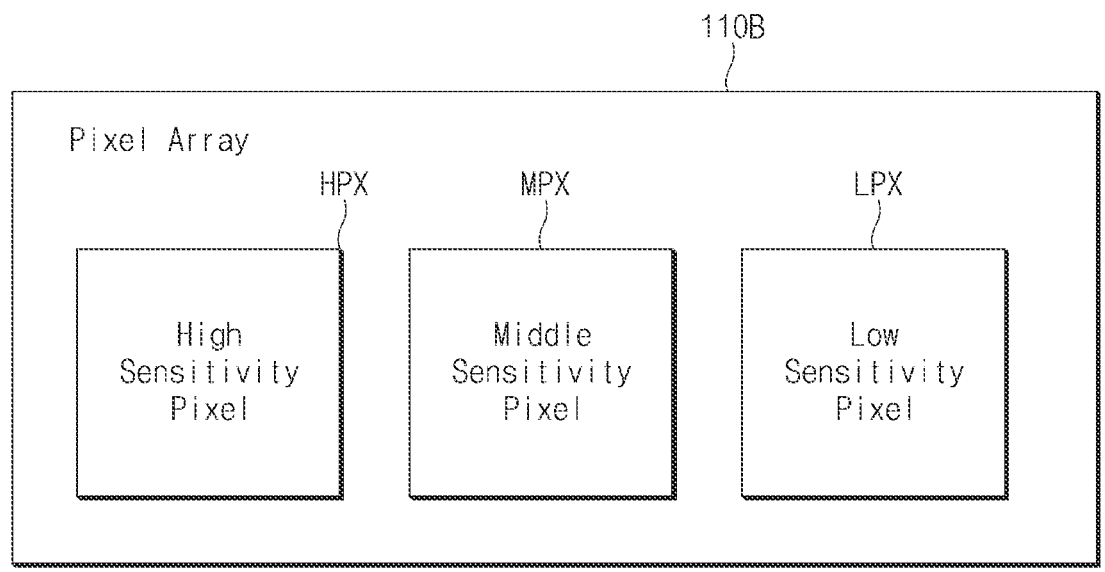
FIG. 7 is a schematic diagram illustrating another example of the pixel array shown in FIG. 2 based on some implementations of the disclosed technology.

FIG. 7 is a schematic diagram illustrating another example of the pixel array shown in FIG. 2 based on some implementations of the disclosed technology.

Referring to FIG. 7, the pixel array 110B is an example of the pixel array 110 shown in FIG. 2. Although the pixel array 110B includes three pixels, i.e., a high-sensitivity pixel (HPX), a middle-sensitivity pixel (MPX), and a low-sensitivity pixel (LPX), other implementations are also possible. For example, the pixel array 110B may include N pixels, whereby N is a positive integer equal to or greater than 3. The pixels included in the pixel array 110B may include three types of pixels, i.e., a high-sensitivity pixel (HPX), a middle-sensitivity pixel (MPX), and a low-sensitivity pixel (LPX). Accordingly, each of the pixels included in the pixel array 110B may correspond to any one of the high-sensitivity pixel (HPX), the middle-sensitivity pixel (MPX), and the low-sensitivity pixel (LPX). The high-sensitivity pixel (HPX), the middle-sensitivity pixel (MPX), and the low-sensitivity pixel (LPX) may be arranged in the pixel array 110B together. The number of high-sensitivity pixels (HPX), the number of middle-sensitivity pixels (MPX), and the number of low-sensitivity pixels (LPX) included in the pixel array 110B may be selected as desired in specific implementations.

The high-sensitivity pixel (HPX) and the low-sensitivity pixel (LPX) shown in FIG. 7 are substantially identical to those of FIG. 5, and as such a detailed description thereof will herein be omitted for convenience of description. The middle-sensitivity pixel (MPX) may be a pixel in which the amount of increase in response due to an increase in the intensity of incident light is larger than that of the low-sensitivity pixel (LPX) and is less than that of the high-sensitivity pixel (HPX).

Figure 8:
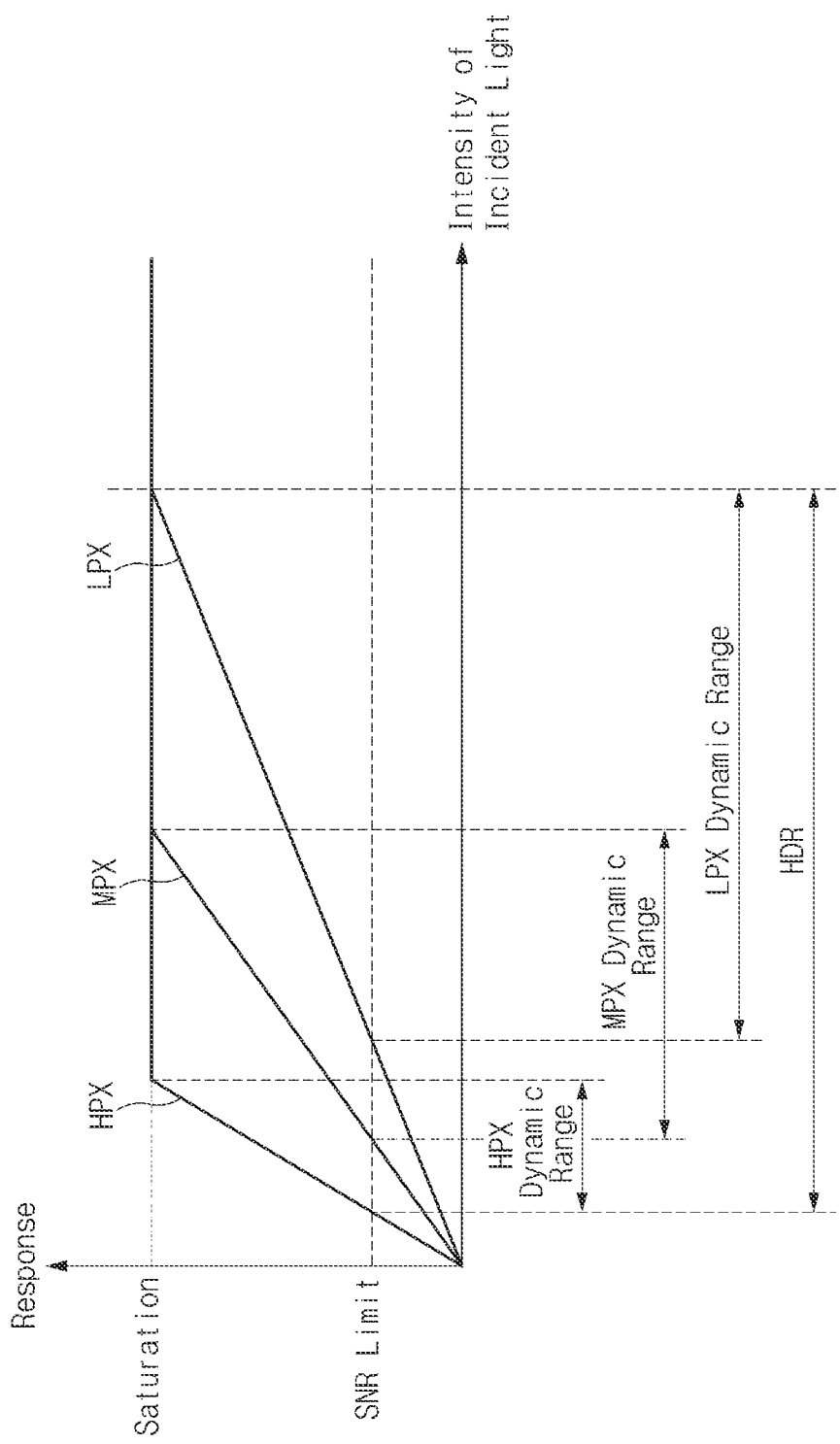
FIG. 8 is a graph illustrating an example of responses of a high-sensitivity pixel, a middle-sensitivity pixel, and a low-sensitivity pixel shown in FIG. 7 based on some implementations of the disclosed technology.

FIG. 8 is a graph illustrating an example of responses depending on illuminance of the high-sensitivity pixel (HPX), the middle-sensitivity pixel (MPX), and the low-sensitivity pixel (LPX) shown in FIG. 7 based on some implementations of the disclosed technology.

As can be seen from FIG. 8, a response of the high-sensitivity pixel (HPX), a response of the middle-sensitivity pixel (MPX), and a response of the low-sensitivity pixel (LPX) are changed depending on illuminance indicating the intensity of incident light applied to the corresponding pixel. The HPX response and the LPX response shown in FIG. 8 are substantially identical to those of FIG. 3, and as such a detailed description thereof will herein be omitted for convenience of description.

The middle-sensitivity pixel (MPX) provides the response such that the amount of increase in response to an increase in the intensity of incident light is higher than that of the low-sensitivity pixel (LPX) and less than that of the high-sensitivity pixel (HPX). Thus, the response of the middle-sensitivity pixel (MPX) increase until the response reaches the saturation level with a slope that is higher than that of the low-sensitivity pixel (LPX) and is lower than that of the high-sensitivity pixel (HPX) in response to the increasing intensity of incident light and have a fixed level even with the increase of the intensity of incident light after the response reaches the saturation level.

As shown in FIG. 8, assume the case that only the high-sensitivity pixel (HPX) and the low-sensitivity pixel (LPX) are included without the middle-sensitivity pixel (MPX) and that the amount of increase in response of the low-sensitivity pixel (LPX) due to an increase in the intensity of incident light decrease or the amount of increase of the high-sensitivity pixel in response due to an increase in the intensity of incident light increases. In this case, the minimum value of the low-sensitivity pixel (LPX) dynamic range may exceed the maximum value of the high-sensitivity pixel (HPX) dynamic range, which causes a gap to occur between the LPX dynamic range and the HPX dynamic range. As a result, the image sensing device 100 may not obtain a valid response at a level of illuminance corresponding to such gap.

In the implementation of FIG. 8, such gap can be prevented from occurring by providing the middle-sensitivity pixel (MPX). Since the middle-sensitivity pixel (MPX) provides the response such that the amount of increase in response due to an increase in the intensity of incident light is higher than that of the low-sensitivity pixel (LPX) and is less than that of the high-sensitivity pixel (HPX), the MPX dynamic range may have the maximum value higher than the minimum value of the LPX dynamic range, and may have the minimum value less than the maximum value of the HPX dynamic range. As a result, the MPX dynamic range can cover the gap between the LPX dynamic range and the HPX dynamic range.

High dynamic range (HDR) can be implemented using a response of the high-sensitivity pixel (HPX) suitable for the low-illuminance range, a response of the middle-sensitivity pixel (MPX) suitable for the middle-illuminance range, and a response of the low-sensitivity pixel (LPX) suitable for the high-illuminance range. Thus, the implementation providing the pixels including the high-sensitivity pixel (HPX), the middle-sensitivity pixel (MPX), and the low-sensitivity pixel (LPX) can allow the pixel array 110B to have a high dynamic range (HDR) that ranges from the minimum value of the HPX dynamic range to the maximum value of the LPX dynamic range without causing the gap between the HPX dynamic range and the LPX dynamic range. In the implementation of the disclosed technology, at least a portion of the HPX dynamic range, at least a portion of the MPX dynamic range, and at least a portion of the LPX dynamic range may overlap each other.

A method for synthesizing the HDR image corresponding to the high dynamic range (HDR) using the high-sensitivity pixel (HPX), the middle-sensitivity pixel (MPX), and the low-sensitivity pixel (LPX) may be implemented in various manners. For example, in some implementations, the HDR image may be synthesized by calculating (e.g., summing) the HPX response, the MPX response, and the LPX response, and/or forming of an image based on the HPX response at a low-illuminance level, forming of an image based on the MPX response at a middle-illuminance level, and/or forming of an image based on the LPX response at a high-illuminance level can be implemented. Without being limited thereto, other various imaging techniques can be implemented to provide a high dynamic range (HDR) image corresponding to the high dynamic range (HDR) using the high-sensitivity pixel (HPX), the middle-sensitivity pixel (MPX) and the low-sensitivity pixel (LPX).

In the image sensing device 100, the high-sensitivity pixel (HPX), the middle-sensitivity pixel (MPX), and the low-sensitivity pixel (LPX) are arranged in the pixel array 110B, such that the image sensing device 100 can synthesize the HDR image using an image acquired through only one exposure.

Figure 9:
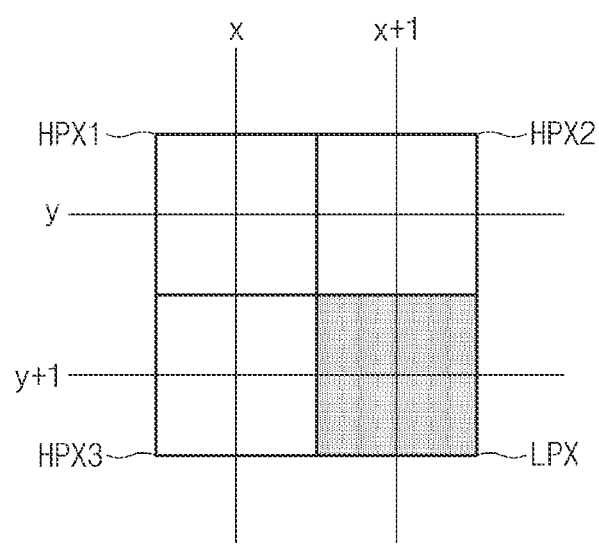
FIG. 9 is a schematic diagram illustrating an example of arrangement of high-sensitivity pixels and low-sensitivity pixels in the pixel array shown in FIG. 5 based on some implementations of the disclosed technology.

FIG. 9 is a schematic diagram illustrating an example of arrangement of high-sensitivity pixels (HPX) and low-sensitivity pixels (LPX) in the pixel array shown in FIG. 5 based on some implementations of the disclosed technology.

Referring to FIG. 9, the pixel array 110A may have an exemplary arrangement structure in which three high-sensitivity pixels HPX1~HPX3 and a single low-sensitivity pixel (LPX) are arranged in a (2×2) matrix array including 2 rows and 2 columns. Although the pixel array 110A includes 4 pixels for convenience of description, other implementations are also possible. For example, four pixels may be repeatedly arranged in row and column directions of the pixel array 110A.

In the example of FIG. 9, the high-sensitivity pixel (HPX1) may be disposed such that a center portion of the high-sensitivity pixel (HPX1) is located at a point (x, y), the high-sensitivity pixel (HPX2) may be disposed such that a center portion of the high-sensitivity pixel (HPX2) is located at a point (x+1, y), and the high-sensitivity pixel HPX3 may be disposed such that a center portion of the high-sensitivity pixel (HPX3) is located at a point (x, y+1). In addition, the low-sensitivity pixel (LPX) may be disposed such that a center portion of the low-sensitivity pixel (LPX) is located at a point (x+1, y+1).

Although the low-sensitivity pixel (LPX) of the pixel array 110A is disposed at a position corresponding to the right lower end of the (2×2) matrix, other implementations are also possible, and it should be noted that the low-sensitivity pixel (LPX) can also be disposed at other positions as needed. In addition, the number of low-sensitivity pixels (LPX) included in the pixel array 110A may also be set to 2 or 3.

Figure 10:
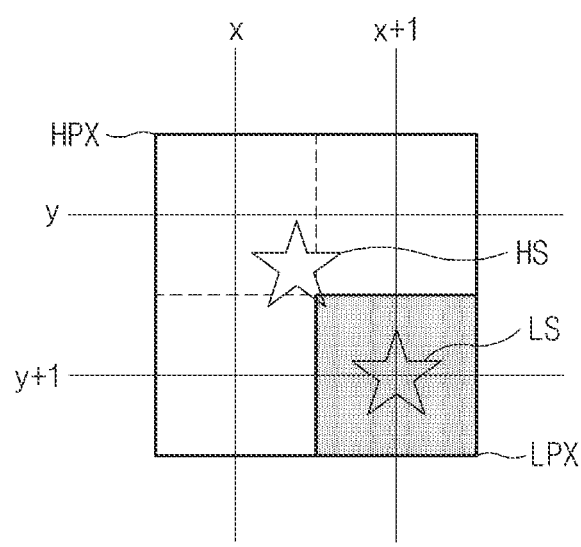
FIG. 10 is a diagram illustrating an example of operations of adjusting a sampling position in the pixel array shown in FIG. 9 based on some implementations of the disclosed technology.

FIG. 10 is a diagram illustrating an example of operations of adjusting the sampling position in the pixel array 110A shown in FIG. 9 based on some implementations of the disclosed technology.

Referring to FIG. 10, the position values of three high-sensitivity pixels HPX1~HPX3 having the same sensitivity are summed to be treated as a single high-sensitivity pixel (HPX). In order to synthesize images of three high-sensitivity pixels HPX1~HPX3 and an image of one low-sensitivity pixel (LPX), a sampling position (HS) of three high-sensitivity pixels HPX1~HPX3 can be adjusted based on a sampling position (LS) of the low-sensitivity pixel (LPX).

For example, all of the coordinate values indicating the positions of three high-sensitivity pixels HPX1~HPX3 may be summed, and the sum of the coordinate values may be averaged, so that the sampling position (HS) of the high-sensitivity pixels HPX1~HPX3 can be calculated. The sampling position (LS) of the low-sensitivity pixel (LPX) is set to a reference position, and the sampling position (HS) of the high-sensitivity pixels (HPX1~HPX3) is then subtracted from the sampling position (LS) of the low-sensitivity pixel (LPX), so that the shifting amount of the sampling position (HS) of the high-sensitivity pixels HPX1~HPX3 can be recognized.

The sampling position (HS) of the three high-sensitivity pixels HPX1~HPX3 can be calculated using the following Equation 1.

$$\{(x,y)+(x+1,y)+(x,y+1)\}/3=(x+\tfrac{1}{3},y+\tfrac{1}{3}) \qquad [\text{Equation 1}]$$

In Equation 1, (x,y) denotes a coordinate value indicating the position of the high-sensitivity pixel (HPX1), (x+1,y) denotes a coordinate value indicating the position of the high-sensitivity pixel (HPX2), and (x, y+1) denotes a coordinate value indicating the position of the high-sensitivity pixel (HPX3). The coordinates values (hereinafter referred to as 'position values') indicating the positions of the high-sensitivity pixels HPX1~HPX3 may be summed, and the sum of the position values of the high-sensitivity pixels HPX1~HPX3 may be divided by 3 indicating the number of high-sensitivity pixels HPX1~HPX3, so that the average value of the position values of the high-sensitivity pixels HPX1~HPX3 can be acquired. As a result, (x+⅓,y+⅓) indicating the sampling position (HS) of the high-sensitivity pixel (HPX) can be calculated. Thus, at the sampling position (LS) of the low-sensitivity pixel (LPX), 'x' may be equal to 'y' (i.e., x=y).

When the position values of the high-sensitivity pixels HPX1~HPX3 are not summed, the sampling position of the high-sensitivity pixel (HPX1) may be set to the center point (x,y) of the high-sensitivity pixel (HPX1), the sampling position of the high-sensitivity pixel (HPX2) may be set to the center point (x+1,y) of the high-sensitivity pixel (HPX2), and the sampling position of the high-sensitivity pixel (HPX3) may be set to the center point (x,y+1) of the high-sensitivity pixel (HPX3). However, in some implementations, since three high-sensitivity pixels HPX1~HPX3 having the same sensitivity are treated as one high-sensitivity pixel (HPX), the sampling position (HS) may move as much as the average value (x+⅓,y+⅓) of the positions of three high-sensitivity pixels HPX1~HPX3, as can be seen from FIG. 10.

The sampling position (LS) of one low-sensitivity pixel (LPX) can be calculated using the following Equation 2.

$$(x+1,y+1) \qquad [\text{Equation 2}]$$

In Equation 2, the sampling position (LS) of the low-sensitivity pixel (LPX) may be set to a region where the (x+1) coordinates and the (y+1) coordinates cross each other. Thus, the sampling position (LS) of the low-sensitivity pixel (LPX) may be set to (1,1). Thus, at the sampling position (LS) of the low-sensitivity pixel (LPX), 'x' may be equal to 'y' (i.e., x=y).

In addition, the shifting amount of the sampling position (HS) of the high-sensitivity pixels HPX1~HPX3 can be calculated using the following Equation 3.

$$(x+1,y+1)-(x+\tfrac{1}{3},y+\tfrac{1}{3})=(\tfrac{2}{3},\tfrac{2}{3}) \qquad [\text{Equation 3}]$$

The coordinate of (x+⅓,y+⅓) (shown in Equation 1) indicates the sampling position (HS) of the high-sensitivity pixels HPX1~HPX3 and may be subtracted from (x+1,y+1) (shown in Equation 2) to produce a new coordinate indicating the sampling position (LS) of the low-sensitivity pixel (LPX), such that the shifting amount of the sampling position (HS) of the high-sensitivity pixels HPX1~HPX3 can be calculated to be (⅔,⅔) as can be seen from Equation 3. When the sampling position (LS) of the low-sensitivity pixel (LPX) is set to the reference position, it can be recognized that the sampling position (HS) of the high-sensitivity pixels HPX1~HPX3 is shifted by ⅔ in the X-axis direction and is shifted by ⅔ in the Y-axis direction.

The above "shifting amount" may refer to the amount of movement of each pixel that is used to match the sampling position (LS) of the low-sensitivity pixel (LPX) to the sampling position (HS) of the high-sensitivity pixels HPX1~HPX3. For convenience of description, it can be assumed that images are classified into two types of pixels having different sensitivities, e.g., the low-sensitivity pixel LPX and the high-sensitivity pixel HPX. When the sampling position of one image is adjusted based on the sampling position of the other image, the degree of mismatch between the two sampling positions may be referred to as the "shifting amount".

In order to overlap and synthesize a plurality of images having different exposure times in the pixel array 110A, the sampling positions of the respective images can be matched to each other through interpolation of the respective images. Thus, a difference in sampling position between the images to be synthesized is not always denoted by an integer multiple of the size of each pixel. In order to address this issue, adjustment in position between the respective images need to be performed in a manner that the sampling positions of the respective images can be matched to each other through interpolation processing.

When each of the images is interpolated as described above, the bokeh phenomenon may occur in the corresponding image. Here, the bokeh phenomenon may refer to a specific operation that allows an image of a near-field object to be more clearly viewed or focused with higher definition or allows an image of a far-field object to be out-of-focus, thereby causing an image of a background object of the image to be blurred. For example, it is assumed that two images having different exposure amounts are synthesized using exposure time(s) or filter(s), resulting in an increase in the dynamic range of the image. In this case, there is a need to adjust the position of an image with a smaller exposure amount and the position of another image with a larger exposure amount. Due to such position adjustment, the bokeh phenomenon may occur in the image.

Accordingly, the image processing device based on some implementations of the disclosed technology can determine any one of the plurality of images having different exposure amounts to be a reference position, and can adjust the sampling position of the remaining images based on the reference position, such that occurrence of the bokeh phenomenon can be prevented. For example, the sampling position of the high-sensitivity image having a large amount of exposure may be adjusted based on the low-sensitivity image having a small amount of exposure, or the sampling position of the low-sensitivity image having a small amount of exposure can be adjusted based on the high-sensitivity image having a large amount of exposure.

Figure 11:
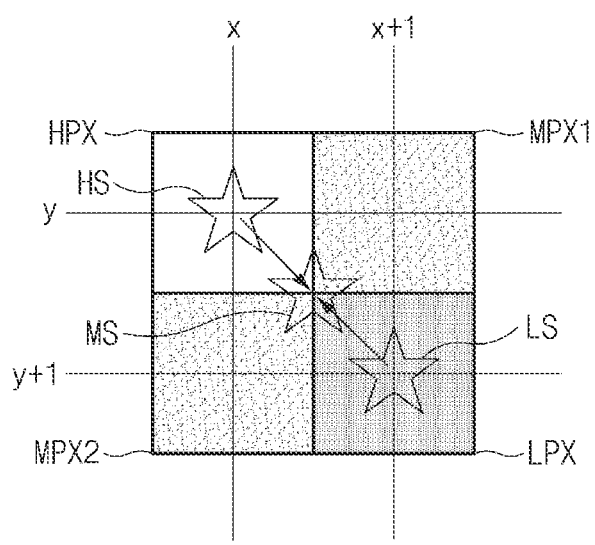
FIG. 11 is a diagram illustrating an example of operations of adjusting a sampling position in the pixel array shown in FIG. 7 based on some implementations of the disclosed technology.

FIG. 11 is a diagram illustrating an example of operations of adjusting the sampling position in the pixel array shown in FIG. 7 based on some implementations of the disclosed technology.

Referring to FIG. 11, the pixel array 110B may illustrate an exemplary arrangement structure in which one high-sensitivity pixel (HPX), two middle-sensitivity pixels MPX1 and MPX2, and one low-sensitivity pixel (LPX) are arranged in a (2×2) matrix array with 2 rows and 2 columns. Although the pixel array 110B shown in FIG. 11 includes 4 pixels, other implementations are also possible. For example, 4 pixels may be repeatedly arranged in row and column directions of the pixel array 110B.

The high-sensitivity pixel (HPX) may be disposed such that a center portion of the high-sensitivity pixel (HPX) is located at a region where the Y coordinates and the X coordinates cross each other. Among the middle-sensitivity pixels MPX1 and MPX2, the middle-sensitivity pixel (MPX1) may be disposed such that a center portion of the middle-sensitivity pixel (MPX1) is located at a region where the Y coordinates and the (X+1) coordinates cross each other, and the other middle-sensitivity pixel (MPX2) may be disposed such that a center portion of the middle-sensitivity pixel (MPX2) is located at a region where the (y+1) coordinates and the X coordinates cross each other. In addition, the low-sensitivity pixel (LPX) may be disposed such that a center portion of the low-sensitivity pixel (LPX) is located at a region where the (Y+1) coordinates and the (X+1) coordinates cross each other.

Although the low-sensitivity pixel (LPX) included in the pixel array 110B is disposed at a position corresponding to the right lower end of the (2×2) matrix array and the high-sensitivity pixel (HPX) included in the pixel array 110B is disposed at a position corresponding to a left upper end of the (2×2) matrix matrix, other implementations are also possible, and it should be noted that the low-sensitivity pixel (LPX) can also be disposed at other positions as needed. In addition, the number of high-sensitivity pixels (HPX) included in the pixel array 110B may also be set to 2 or 3, or the number of low-sensitivity pixels (LPX) included in the pixel array 110B may also be set to 2 or 3.

In the implementation of FIG. 11, the position values of two middle-sensitivity pixels MPX1 and MPX2 having the same sensitivity are summed, so that the sum of the position values can be treated as a single middle-sensitivity pixel (MPX). In order to synthesize an image of one high-sensitivity pixel (HPX), an image of two middle-sensitivity pixels MPX1 and MPX2, and an image of one low-sensitivity pixel (LPX), the sampling position (HS) of the high-sensitivity pixel (HPX) and the sampling position (LS) of the low-sensitivity pixel (LPX) can be adjusted based on the sampling position (MS) of the middle-sensitivity pixels MPX1 and MPX2.

For example, all of coordinate values indicating the positions of two middle-sensitivity pixels MPX1 and MPX2 may be summed, and the sum of the coordinate values may be averaged to calculate the sampling position (MS) of the middle-sensitivity pixels MPX1 and MPX2. The sampling position (MS) of the middle-sensitivity pixels MPX1 and MPX2 may be set to the reference position, and the sampling position (HS) of the high-sensitivity pixel (HPX) may be subtracted from the sampling position (MS) of the middle-sensitivity pixels MPX1 and MPX2, such that the shifting amount of the sampling position (HS) of the high-sensitivity pixel (HPX) can be recognized. In addition, if the sampling position (MS) of the middle-sensitivity pixels MPX1 and MPX2 is set to the reference position, and the sampling position (LS) of the low-sensitivity pixel (LPX) is then subtracted from the sampling position (MS) of the middle-sensitivity pixels MPX1 and MPX2, the shifting amount of the sampling position (LS) of the low-sensitivity pixel (LPX) can be recognized.

The sampling position (HS) of the high-sensitivity pixel (HPX) can be calculated using the following Equation 4.

$$(x,y) \quad \text{[Equation 4]}$$

In Equation 4, the sampling position (HS) of the high-sensitivity pixel (HPX) may be set to a region where X coordinates and Y coordinates cross each other. For example, the sampling position (HS) of the high-sensitivity pixel (HPX) may be set to (0,0).

In addition, the sampling position (MS) of the middle-sensitivity pixels MPX1 and MPX2 can be calculated using the following Equation 5.

$$\{(x+1,y)+(x,y+1)\}/2 = (x+\tfrac{1}{2}, y+\tfrac{1}{2}) \quad \text{[Equation 5]}$$

In Equation 5, (x+1,y) denotes a coordinate value indicating the position of the middle-sensitivity pixel (MPX1), and (x,y+1) denotes a coordinate value indicating the position of the middle-sensitivity pixel (MPX2). All of the coordinate values indicating the positions of the middle-sensitivity pixels MPX1 and MPX2 are summed, and the sum of the coordinate values is divided by 2 indicating the number of middle-sensitivity pixels MPX1 and MPX2, resulting in an average value of the coordinate values. As a result, $(x+\tfrac{1}{2}, y+\tfrac{1}{2})$ indicating the sampling position (MS) of the middle-sensitivity pixels MPX1 and MPX2 can be calculated as shown in Equation 5.

When the position values of the middle-sensitivity pixels MPX1 and MPX2 are not summed, the sampling position of the middle-sensitivity pixel (MPX1) may be set to the center point (x+1,y) of the middle-sensitivity pixel (MPX1), and the sampling position of the middle-sensitivity pixel (MPX2) may be set to the center point (x,y+1) of the middle-sensitivity pixel (MPX2). However, in some implementations, since two middle-sensitivity pixels MPX1 and MPX2 having the same sensitivity are treated as one middle-sensitivity pixel (MPX), the sampling position (MS) may move as much as the average value $(x+\tfrac{1}{2}, y+\tfrac{1}{2})$ of the positions of the middle-sensitivity pixels MPX1 and MPX2, as can be seen from FIG. 11.

In addition, the sampling position (LS) of one low-sensitivity pixel (LPX) can be calculated using the following Equation 6.

$$(x+1, y+1) \quad \text{[Equation 6]}$$

In Equation 6, the sampling position (LS) of the low-sensitivity pixel (LPX) may be set to a region where (x+1) coordinates and (y+1) coordinates cross each other. That is, the sampling position (LS) of the low-sensitivity pixel (LPX) may be set to (1,1). Thus, at the sampling position (LS) of the low-sensitivity pixel (LPX), 'x' may be equal to 'y' (i.e., x=y).

In addition, the shifting amount of the sampling position (HS) of the high-sensitivity pixel (HPX) can be calculated using the following equation 7.

$$(x+\tfrac{1}{2}, y+\tfrac{1}{2}) - (x,y) = (\tfrac{1}{2}, \tfrac{1}{2})$$ [Equation 7]

In more detail, (x,y) (shown in Equation 4) indicating the sampling position (HS) of the high-sensitivity pixel (HPX) is subtracted from (x+½,y+½) (shown in Equation 5) indicating the sampling position (MS) of the middle-sensitivity pixels MPX1 and MPX2, so that the shifting amount of the sampling position (HS) of the high-sensitivity pixel (HPX) can be calculated to be (½,½) as can be seen from Equation 7. That is, when the sampling position (HS) of the middle-sensitivity pixels MPX1 and MPX2 is set to the reference position, it can be recognized that the sampling position (HS) of the high-sensitivity pixel (HPX) is shifted by ½ in the X-axis direction and is shifted by ½ in the Y-axis direction.

The above "shifting amount" may refer to the amount of movement of each pixel that is used to match the sampling position (MS) of the middle-sensitivity pixels MPX1 and MPX2 to the sampling position (HS) of the high-sensitivity pixel (HPX). For convenience of description, it can be assumed that images are classified into three types of pixels having different sensitivities (e.g., the low-sensitivity pixel LPX, the high-sensitivity pixel HPX, the middle-sensitivity pixel MPX). As a result, when the sampling position of one image is set to a reference position and the sampling position of the other image is then adjusted based on the reference position, the degree of mismatch between the two sampling positions may be referred to as the "shifting amount".

In order to overlap and synthesize the plurality of images having different exposure amounts in the pixel array 110B, the sampling positions of the respective images should be matched to each other through interpolation of the respective images. However, when each of the images is interpolated as described above, the bokeh phenomenon may occur in the corresponding image.

Accordingly, the image processing device based on some implementations of the disclosed technology can determine any one of the plurality of images having different exposure amounts to be the reference position, and can adjust the sampling position of the remaining two images other than the determined image based on the reference position, such that occurrence of the bokeh phenomenon can be prevented. For example, the sampling position of the high-sensitivity image having a large amount of exposure may be adjusted based on the middle-sensitivity image having a medium amount of exposure, or the sampling position of the low-sensitivity image having a small amount of exposure may be adjusted based on the middle-sensitivity image having a medium amount of exposure.

Figure 12:
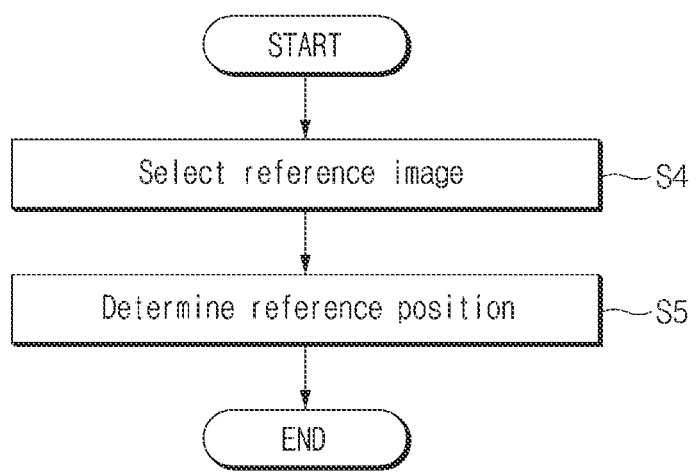
FIG. 12 is a flowchart illustrating an example of operations of selecting a reference image using the image signal processor shown in FIG. 1 based on some implementations of the disclosed technology.

FIG. 12 is a flowchart illustrating an example of operations of selecting a reference image using the image signal processor 200 shown in FIG. 1 based on some implementations of the disclosed technology. The reference image can be used as the reference position for adjusting the sampling positions of one or more pixels in the image sensing device.

Referring to FIG. 12, the processor 210 may select a reference image to be used as a sampling reference among a plurality of images based on an imaging condition, a photographing mode, or at least one of photographed images (Step S4).

Thereafter, a reference position may be established in the selected reference image (Step S5). In some implementations, the reference position may be determined based on the amount of exposure. For example, the reference position may be determined based on the size of a high-sensitivity portion of a high-sensitivity image having a large amount of exposure. In another embodiment, some invalid pixels that cannot be used to perform image synthesis due to occurrence of saturation or others can be detected from one image, and the reference position can be determined based on the number (or amount) of invalid pixels that cannot be used for image synthesis.

In another embodiment, an image having edges or textures may be used to set a reference position. In some implementations, the reference position may be determined based on a brightness of a specific region within the image, the specific region including edges or textures. For example, when a brightness of the specific region having edges or textures within one image is equal to or greater than a reference brightness, the sampling position (LS) of the low-sensitivity pixel (LPX) may be set to the reference position. On the other hand, when a brightness of the specific region having edges or textures within one image is less than the reference brightness, the sampling position (HS) of the high-sensitivity pixel (HPX) may be set to the reference position.

In another embodiment, an image (e.g., a face image) acquired when the focused object (i.e., in-focus object) is exposed with the appropriate amount of exposure may be used to set a reference position. For example, the reference position can be determined based on a brightness of a specific region including the face image from the entire image. The operation of determining the reference position based on whether or not the face image is detected will be described later with reference to FIGS. 16 to 18.

In another embodiment, a preview image that is not used for image synthesis may be selected as the reference image to determine the reference position. In this case, the preview image may refer to an image that can be used to perform photographing through the image sensing device 100, and may also refer to an image for reading specific information about the photographed object in a preview mode.

In some implementations, the image sensing device 100 may perform an image capture of the target object in various manners, resulting in formation of various types of images. For example, the image sensing device 100 may also form or produce a scale-down image as needed. Here, the scale-down image may refer to an image that provides a user with a preview image before and after the user photographs a still image or moving images. While the user performs photographing using the image sensing device 100, the image sensing device 100 may produce image data having the actual resolution established in the photographing mode. In order to produce the preview image that is provided to the user before and after the user performs photographing using the image sensing device 100, a scale-down image having a lower resolution than the actual resolution established in the photographing mode can be produced. Accordingly, the processor 210 can select the scale-down preview image provided from the image sensing device 100 as a reference image to set the reference position.

In another embodiment, the positions of the remaining images other than the reference image may be adjusted based on the reference image that has been selected in step S4, such that the sampling positions of the plurality of images can be identical to each other. In another embodiment, when regions having different levels of brightness are mixed in one image, a reference position can be determined by allocating different weights to the respective regions.

Figure 13:
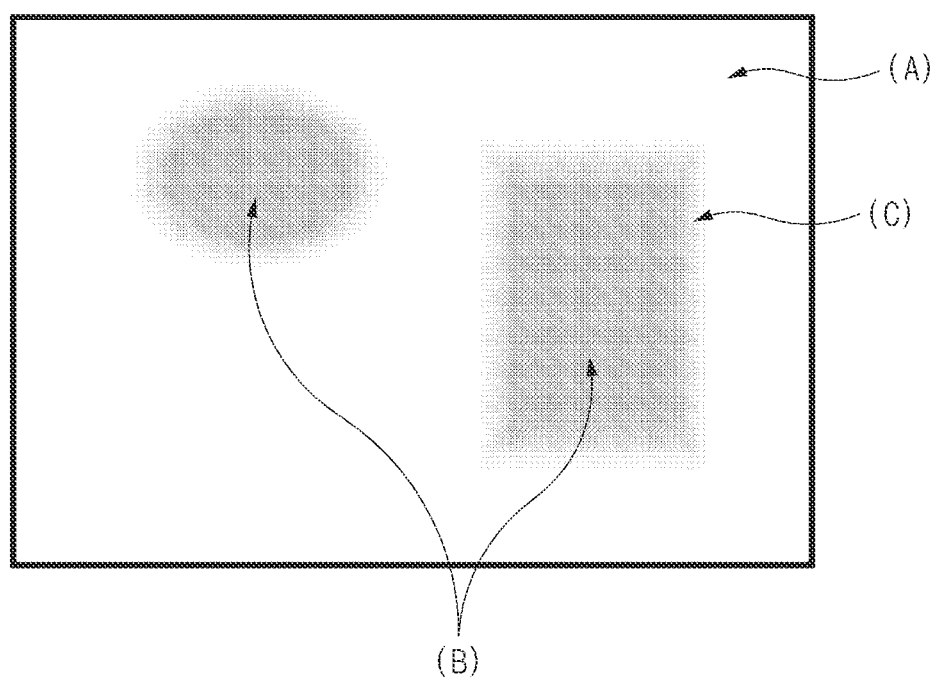
FIG. 13 is a diagram illustrating an example of operations of determining a reference position for each image region using the image signal processor shown in FIG. 1 based on some implementations of the disclosed technology.

FIG. 13 is a diagram illustrating an example of operations of establishing a reference position for each image region using the image signal processor shown in FIG. 1 based on some implementations of the disclosed technology.

Referring to FIG. 13, the processor 210 may determine the reference position for each region (place) based on at least one of the photographed images. The processor 210 may allocate different weights to the respective regions, and may determine the reference position of the image based on the weights differently allocated to the respective regions. In another embodiment, the processor 210 can calculate load to be used for image synthesis, and can determine the reference position based on the calculated load.

For example, it is assumed that one image includes a high-illuminance region (A) in which a brightness corresponding to the amount of exposure is equal to or greater than a reference brightness, and a low-illuminance region (B) in which a brightness corresponding to the amount of exposure is less than the reference brightness. Then, in the high-illuminance region (A) included in one image, the sampling position (LS) of the low-sensitivity pixel (LPX) may be set to a reference position. In addition, in the low-illuminance region (B) included in one image, the sampling position (HS) of the high-sensitivity pixel (HPX) may be set to a reference position. In addition, a boundary region (C) may refer to a region in which the high-illuminance region (A) having a large amount of exposure and the low-illuminance region (B) having a small amount of exposure are mixed, such that position adjustment can be performed by slightly moving each of the reference position of the high-sensitivity pixel (HPX) and the reference position of the low-sensitivity pixel (LPX) little by little.

Figure 14:
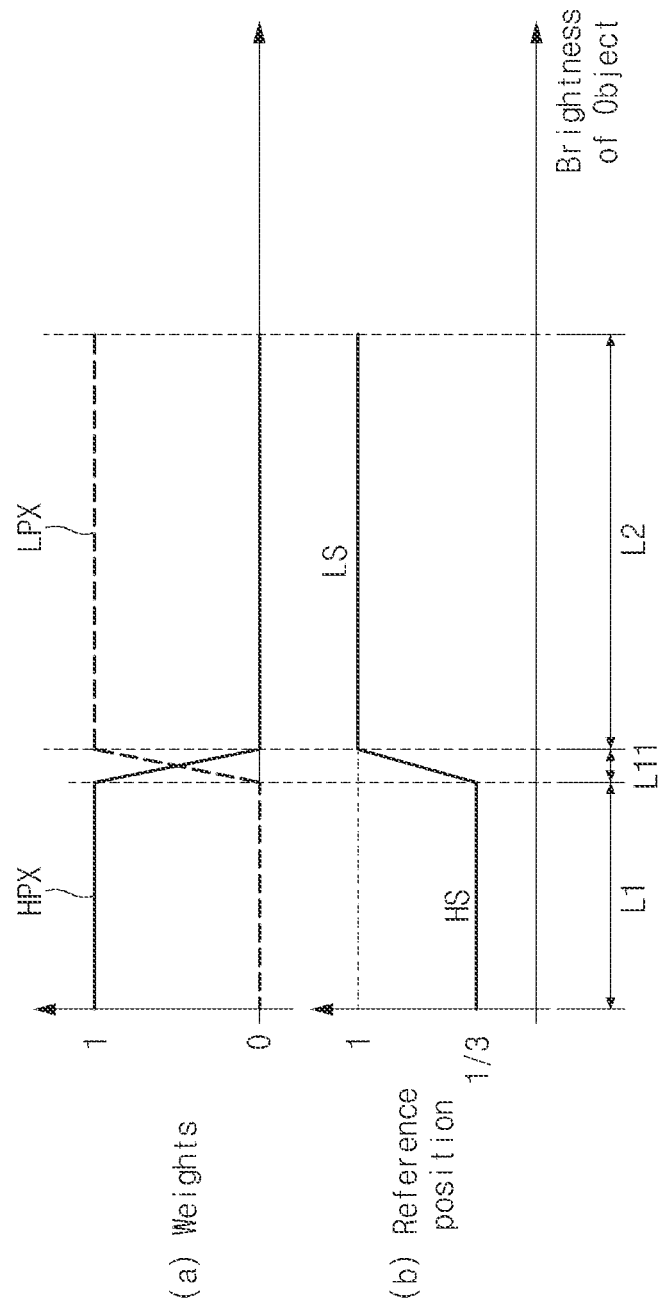
FIG. 14 is a graph illustrating an example of operations of determining the reference position shown in FIG. 13 based on some implementations of the disclosed technology.

FIG. 14 is a graph illustrating an example of operations of determining the reference position shown in FIG. 13 based on some implementations of the disclosed technology.

Referring to (a) and (b) in FIG. 14, a section (L1) may represent a low-illuminance section having a low brightness, a section (L11) may represent a boundary section between a low-illuminance section and a high-illuminance section, and a section (L2) may represent a high-illuminance section having a high brightness.

In the low-illuminance section (L1) before the high-sensitivity pixel (HPX) reaches the saturation level, a specific weight "1" may be assigned to the high-sensitivity pixel (HPX), such that the sampling position (HS) of the high-sensitivity pixel (HPX) can be set to a reference position. That is, in the illuminance range (low-illuminance range) having a relatively low intensity of incident light, the high-sensitivity pixel (HPX) may be set to a reference position. For example, the sampling position (HS) of the high-sensitivity pixel (HPX) may be set to "⅓" as shown in Equation 1.

The boundary section (T11) may refer to a region where an image of the high-illuminance region (A) and an image of the low-illuminance region (B) are synthesized as shown in FIG. 13. In the region where the image of the high-illuminance region (A) and the image of the low-illuminance region (B) are synthesized, the reference position can be adjusted by slightly moving the sampling position (HS) of the high-sensitivity pixel (HPX) and the sampling position (LS) of the low-sensitivity pixel (LPX) little by little, such that the plurality of images can be smoothly concatenated. In other words, in the boundary section (L11), the weight of the high-sensitivity pixel (HPX) may decrease from "1" to "0", and the weight of the low-sensitivity pixel (LPX) may increase from "0" to "1" in a manner that the reference position can be gradually changed.

In the high-illuminance section (L2) before the high-sensitivity pixel (HPX) reaches the saturation level and the low-sensitivity pixel (LPX) reaches the saturation level, a specific weight "1" may be assigned to the low-sensitivity pixel (LPX), such that the sampling position (LS) of the low-sensitivity pixel (LPX) can be set to a reference position. That is, in the illuminance range (high-illuminance range) having a relatively high intensity of incident light, the low-sensitivity pixel (LPX) may be set to a reference position. For example, the sampling position (LS) of the low-sensitivity pixel (LPX) may be set to "1" as shown in Equation 2.

As described above, according to the implementations of the disclosed technology, in the low-illuminance section (L1), the sampling position (HS) of the high-sensitivity pixel (HPX) can be set to the reference position. In the boundary section (L11), both the sampling position (HS) of the high-sensitivity pixel (HPX) and the sampling position (LS) of the low-sensitivity pixel (LPX) can be set to the reference position. In the high-illuminance section (L2), the sampling position (LS) of the low-sensitivity pixel (LPX) can be set to the reference position.

In the sections subsequent to the section (L2), the response of each pixel has reached the saturation level. As a result, although the intensity of incident light increases after the response has reached the saturation level, the response does not increase beyond the saturation level and stays at the saturation level.

Figure 15:
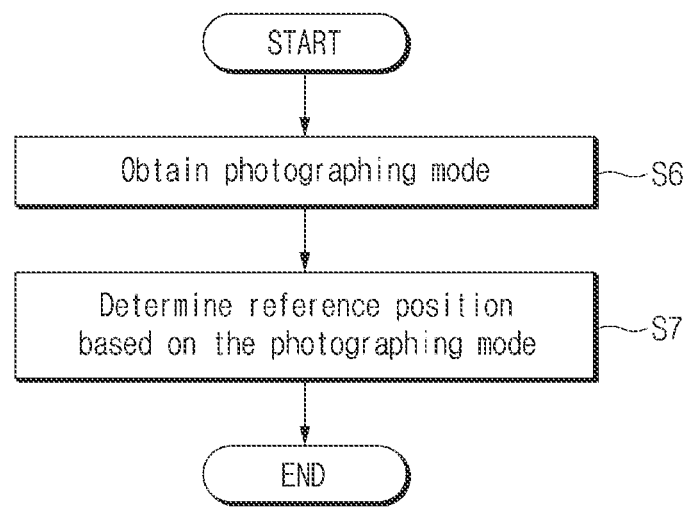
FIG. 15 is a flowchart illustrating an example of operations of determining a reference position according to photographing modes using the image signal processor shown in FIG. 1 based on some implementations of the disclosed technology.

FIG. 15 is a flowchart illustrating an example of operations of determining the reference position according to photographing modes using the image signal processor 200 shown in FIG. 1 based on some implementations of the disclosed technology.

Referring to FIG. 15, the processor 210 may acquire the photographing mode required for image capture (Step S6), and may determine the reference position based on the acquired photographing mode (Step S7).

For example, it is assumed that the photographing mode is set to a night photographing mode. If the photographed scene is a night scene, the photographed night-view image is considered entirely dark in brightness, so that the high-sensitivity pixels (HPX) can be more frequently used for the night-view image than the other sensitivity pixels such as LPXs and MPXs. In this case, the high-sensitivity pixel (HPX) having a large amount of exposure may be set to the reference position.

In some other implementations, it is assumed that the photographing mode is a daytime photographing mode. If the photographed scene is a daytime scene, the photographed daytime image is considered entirely bright in brightness, such that the low-sensitivity pixels (LPX) can be more frequently used for the daytime image than the other sensitivity pixels such as HPXs and MPXs. In this case, the low-sensitivity pixel (LPX) having a small amount of exposure may be set to the reference position.

Figure 16:
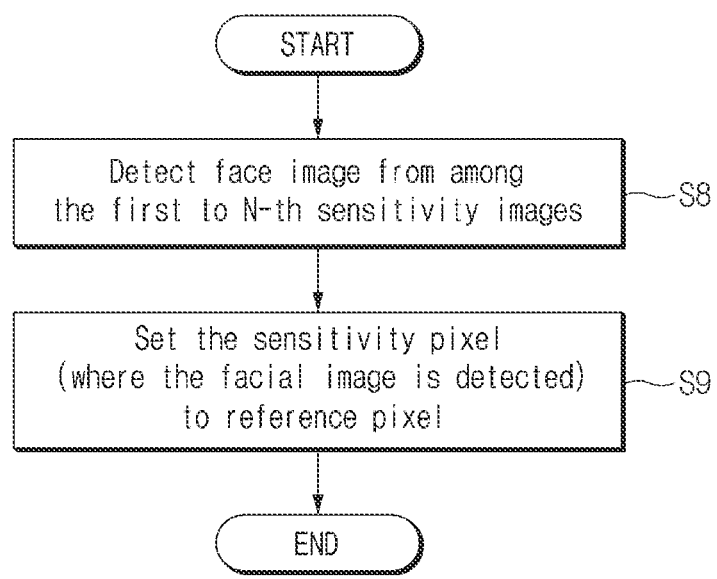
FIG. 16 is a flowchart illustrating an example of operations of determining a reference position by detecting a face image using the image signal processor shown in FIG. 1 based on some implementations of the disclosed technology.

FIG. 16 is a flowchart illustrating an example of operations of determining the reference position by detecting a face image using the image signal processor 200 shown in FIG. 1 based on some implementations of the disclosed technology.

Referring to FIG. 16, the image processing device based on some implementations of the disclosed technology can detect a face image from among the first to N-th sensitivity images (Step S8). For example, if an object region is designated, the image processing device can search for a target object region to be recognized within the image based on the shape, size, position, color, pattern density, etc. of the corresponding object. As a representative example of the disclosed technology, the image processing device can search for and recognize the face image in either a photograph or a preview image. In more detail, the image processing device can search for and detect a plurality of candidates of the face region by referring to color information of the object, and can determine whether or not the corresponding image is the face image based on facial position information (such as eyebrows, eyes, mouth, etc. of the face) included in the detected region.

Assuming that a person (i.e., a user) is subject to a target object of the image processing device, for example, if a portrait photographing mode for photographing the user's face is started, the image processing device can determine a reference position based on the degree of exposure of the user's face photographed through a face detection function (Step S9). That is, assuming that a brightness of the background portion of the photographed image is set to a reference brightness, if a brightness of the region including the face portion is equal to or greater than the reference brightness corresponding to the background portion, this means that the photographed face image has a relatively higher brightness. In this case, the image processing device can detect the face portion from among the image having different sensitivities, and can determine any one of the high-sensitivity or low-sensitivity pixel (HPX or LPX) from which the face image has been detected, to be the reference position.

Figure 17:
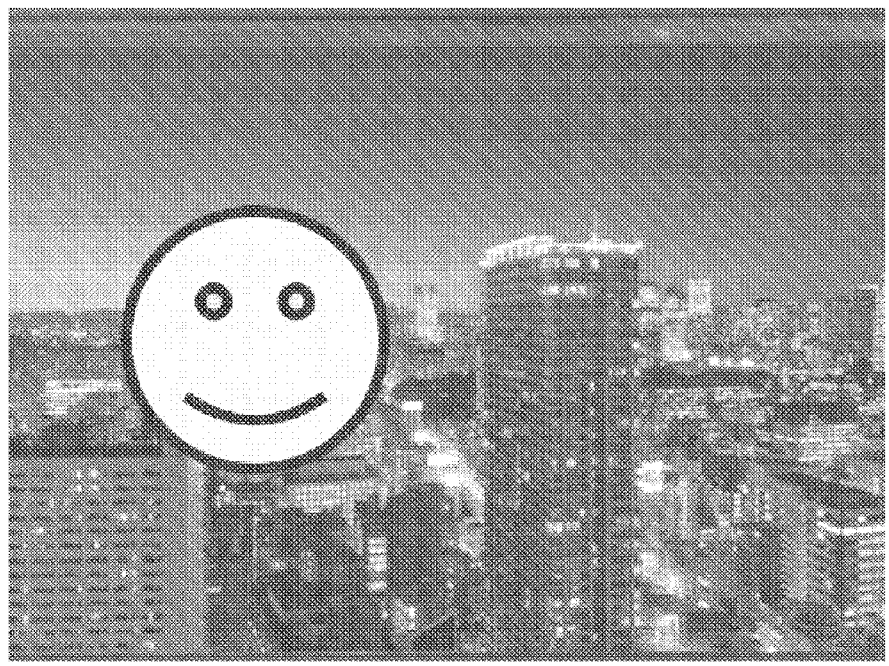
FIGS. 17 and 18 are diagrams illustrating examples of operations of determining the reference position shown in FIG. 16 based on some implementations of the disclosed technology.
Figure 18:
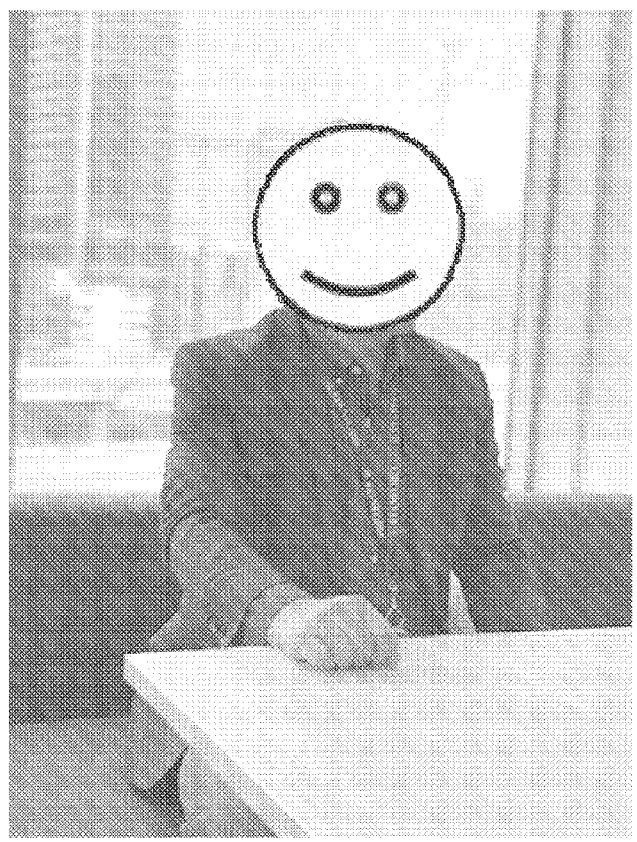

FIGS. 17 and 18 are diagrams illustrating examples of operations of determining the reference position shown in FIG. 16 based on some implementations of the disclosed technology.

FIG. 17 shows a scene in which the user's face is photographed using a night scene as a background. If a night scene is used as a background, the dark night-view portion can be used as the high-sensitivity pixel (HPX) and the bright face portion can be used as the low-sensitivity pixel (LPX). Therefore, in the face image acquired when the user's face is photographed using a night scene as a background, if the face image has a higher brightness than the background image, the low-sensitivity pixel (LPX) can be determined to be the reference position.

FIG. 18 shows a scene in which the user's face is photographed using a clear sky as a background. When the daytime is used as a background, a dark face portion may correspond to the high-sensitivity pixel (HPX) and a bright sky portion may correspond to the low-sensitivity pixel (LPX). Therefore, in the face image acquired when the user's face is photographed using a daytime scene as a background, if the face image has a lower brightness than the background image, the high-sensitivity pixel (HPX) can be determined to be the reference position.

Figure 19:
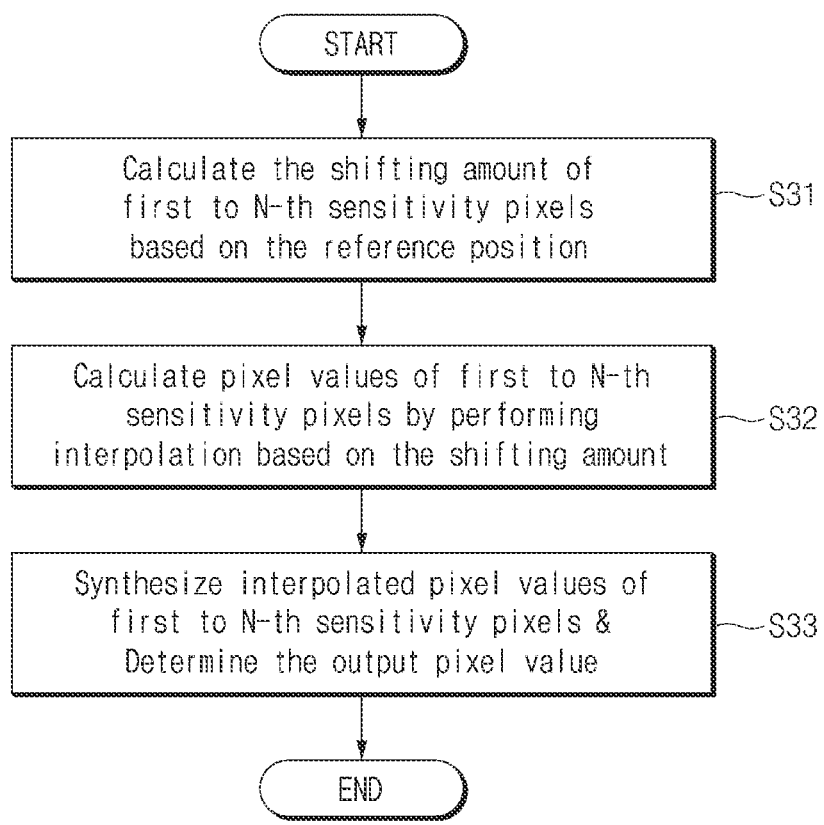
FIG. 19 is a detailed flowchart illustrating an example of the step of determining a pixel value shown in FIG. 3 based on some implementations of the disclosed technology.

FIG. 19 is a detailed flowchart illustrating an example of the operation of determining pixel values shown in FIG. 3 based on some implementations of the disclosed technology.

Referring to FIG. 19, the processor 210 may calculate the shifting amount of each of the first to N-th sensitivity pixels based on the reference position determined by operations included in the flowchart depicted in FIG. 4 (Step S31).

Thereafter, the synthesizer 220 may calculate the pixel value of each of the first to N-th sensitivity pixels by performing interpolation processing based on the shifting amount calculated in step S31 (Step S32). Here, although the interpolation processing can be performed using bilinear interpolation, bicubic interpolation, etc., other implementations are also possible.

Subsequently, the synthesizer 220 can synthesize the interpolated pixel values of the first to N-th sensitivity pixels, and can determine the output pixel values of the respective sensitivity pixels based on the synthesized result (Step S33).

As is apparent from the above description, the image processing device based on some implementations of the disclosed technology can reduce occurrences of the bokeh phenomenon caused by interpolation when synthesizing a plurality of images in the pixel array in which pixels having different sensitivities are mixed.

The embodiments of the disclosed technology may provide a variety of effects capable of being directly or indirectly recognized through the above-mentioned patent document.

Although a number of illustrative embodiments have been described, variations and enhancements to the disclosed embodiments and other embodiments can be made based on what is disclosed in this patent document.

What is claimed is:

1. An image processing device comprising:
    at least one first pixel having a first sensitivity in response to an increase of light incident on the at least one first pixel;
    a second pixel having a second sensitivity different from the first sensitivity in response to the increase of light incident on the second pixel;
    a processor configured to calculate a sampling position of the at least one first pixel and a sampling position of the second pixel, determine a reference position and adjust the sampling position of the at least one first pixel or the second pixel based on the reference position; and
    a synthesizer configured to synthesize an image using pixel values of the at least one first pixel and the second pixel processed by the processor, and provide an output pixel value of each pixel.

2. The image processing device according to claim 1, wherein:
    the processor is further configured to calculate a center of gravity at a position of the at least one first pixel and a center of gravity at a position of the second pixel, and determine the sampling positions of the first and second pixels based on the calculated center of gravity values.

3. The image processing device according to claim 1, wherein the at least one first pixel correspond to two or more first pixels and wherein the processor is further configured to calculate the sampling position by summing and averaging values indicating positions of the two or more first pixels.

4. The image processing device according to claim 3, wherein the processor is further configured to:
    calculate a shifting amount of the sampling position of the at least one first pixel by subtracting the sampling position of the at least one first pixel from the sampling position of the second pixel.

5. The image processing device according to claim 4, wherein:
    the synthesizer is further configured to perform interpolation processing based on the calculated shifting amount.

6. The image processing device according to claim 1, wherein the processor is further configured to:

detect, among the at least one first pixel and the second pixel, a number of pixels, each pixel having a response level that is equal to or higher than a valid response range; and determine the reference position based on the number of detected pixels.

7. The image processing device according to claim 1, wherein:

the processor is further configured to determine the reference position based on a brightness of a specific region within an image that includes at least one of an edge portion, a texture portion, a face portion, or a preview image.

8. The image processing device according to claim 1, wherein:

the processor is further configured to determine the reference position based on a brightness of a captured image acquired in a first mode or a second mode.

9. The image processing device according to claim 8, wherein the processor is further configured to:

determine the at least one first pixel as the reference position for the first mode in which a brightness less than a predetermined brightness is used; and determine the second pixel as the reference position for the second mode in which a brightness equal to or higher than the predetermined brightness is used.

10. The image processing device according to claim 1, wherein the processor is further configured to:

determine the reference position based on whether a brightness of a portion of an image corresponding to in-focus object is higher than a brightness of a remaining portion of the image.

11. The image processing device according to claim 10, wherein the processor is further configured to:

determine the second pixel as the reference position in case that the portion of the image corresponding to the in-focus object has a higher brightness than the brightness of the remaining portion of the image.

12. The image processing device according to claim 10, wherein the processor is further configured to:

determine the at least one first pixel as the reference position in case that the portion of the image corresponding to the in-focus object has a lower brightness than the brightness of the remaining portion of the image.

13. The image processing device according to claim 1, wherein:

the first sensitivity is higher than the second sensitivity.

14. The image processing device according to claim 1, further comprising:

at least one third pixel having a third sensitivity different from the first sensitivity and the second sensitivity, and wherein the processor is further configured to determine the at least one third pixel as the reference position.

15. The image processing device according to claim 14, wherein:

the processor is further configured to calculate a center of gravity at a position of the at least one first pixel, a center of gravity at a position of the second pixel, and a center of gravity at a position of the at least one third pixel, and determine the sampling positions based on the calculated center of gravity values.

16. The image processing device according to claim 14, wherein the at least one third pixel corresponds to two or more third pixels and wherein the processor is further configured to:

calculate the sampling position by summing and averaging values indicating positions of the two or more third pixels.

17. The image processing device according to claim 14, wherein:

the first sensitivity is higher than the third sensitivity; and the third sensitivity is higher than the second sensitivity.

18. An image processing device comprising:

at least one first pixel having a first sensitivity;

a second pixel having a second sensitivity different from the first sensitivity;

a processor operatively coupled to the at least one first pixel and the second pixel and configured to:

calculate a sampling position of the at least one first pixel and a sampling position of the second pixel, allocate weights to the at least one first pixel and the second pixel based on brightness levels of portions of an image that is produced by the at least one first pixel and the second pixel, and determine a reference position based on the allocated weights, wherein the sampling position of the at least one first pixel or the sampling position of the second pixel is adjusted based on the reference position.

19. The image processing device according to claim 18, wherein the processor is configured to:

allocate a first weight to the at least one first pixel in a first portion of the image having a brightness level that is less than a predetermined brightness level; and allocate a second weight to the second pixel in a second portion of the image having a brightness level that is higher than the predetermined brightness level.

20. The image processing device according to claim 18, wherein when one image includes a low-illuminance region where a brightness is less than a reference brightness and a high-illuminance region where a brightness is equal to or higher than the reference brightness, the processor is configured to:

in a boundary region including both the low-illuminance region and the high-illuminance region, determine both the sampling position of the first pixel and the sampling position of the second pixel to be the reference position.

* * * * *